United States Patent [19]

Pfeiffer et al.

[11] 4,173,275

[45] Nov. 6, 1979

[54] DEVICE FOR ASSEMBLING A PLURALITY OF LARGE PANEL LAYERS INTO A PRESS PACK

[75] Inventors: Heinrich Pfeiffer, Eppingen; Richard Brüssel, Sulzfeld, both of Fed. Rep. of Germany

[73] Assignee: Maschinenfabrik J. Dieffenbacher GmbH & Co., Eppingen, Fed. Rep. of Germany

[21] Appl. No.: 767,320

[22] Filed: Feb. 10, 1977

[30] Foreign Application Priority Data

Feb. 10, 1976 [DE] Fed. Rep. of Germany ....... 2605172

[51] Int. Cl.[2] .............. B65G 47/26

[52] U.S. Cl. .............. 198/421; 156/557; 156/563; 156/572; 198/689; 414/32; 414/41; 414/72; 414/121

[58] Field of Search .............. 198/421, 427, 429, 487, 198/488, 689; 156/557, 563, 572; 214/1 BT, 6 FS, 6 M, 8.5 D; 270/58; 271/9, 14

[56] References Cited

U.S. PATENT DOCUMENTS

| | | | |
|---|---|---|---|
| 1,948,001 | 2/1934 | Mensman et al. | 271/164 |
| 2,704,593 | 3/1955 | Galloway | 214/6 M |
| 2,819,806 | 1/1958 | Vieth | 214/1 BT |
| 3,225,891 | 12/1965 | Hickin et al. | 214/1 BT |
| 3,312,327 | 4/1967 | Clapp et al. | 198/421 |
| 3,367,823 | 2/1968 | Clausen et al. | 156/557 |
| 3,603,463 | 9/1971 | Billett et al. | 198/610 |
| 3,723,227 | 3/1973 | Oono et al. | 198/421 |
| 3,884,368 | 5/1975 | Ballard | 214/8.5 D |
| 3,914,154 | 10/1975 | Pfeiffer | 271/9 |
| 3,964,953 | 6/1976 | Mitchard et al. | 271/9 |

*Primary Examiner*—Robert B. Reeves
*Assistant Examiner*—Douglas D. Watts
*Attorney, Agent, or Firm*—Joseph A. Geiger

[57] ABSTRACT

A device for assembling large flexible panel layers into press packs, for the production of layered pressed panels, the device including a plurality of parallel layer collecting lines with two layer stacks each, arranged on opposite sides of a transversely extending press pack assembly conveyor. The latter advances from collecting line to collecting line, as a collecting carriage in each collecting line alternatingly collects panel layers from its two layer stacks. The collecting carriages are moved by means of crank drives; the layer stacks are adjustably positioned under light beam position markers.

12 Claims, 8 Drawing Figures

DEVICE FOR ASSEMBLING A PLURALITY OF LARGE PANEL LAYERS INTO A PRESS PACK

BACKGROUND OF THE INVENTION

1. Field of the Invention

The present invention relates to machinery for the handling of very large thin sheets, and, more particularly, to a device for assembling a number of different panel layers, including carrier panels and outer layers, into a press pack, for the production of layered pressed panels and decorative panels, or for the application of coated paper sheets, liners, veneer sheets, plastic films, etc., to panels of chipboard, fiber, metal, plastic, or plywood, the various panel layers being mechanically singulated off corresponding layer stacks and transferred to a collecting station for assembly into a press pack, which is then fed to a panel press for curing under pressure.

2. Description of the Prior Art

In recent years, both the variety of pressed panels, in terms of their composition, and the application possibilities for such pressed panels have undergone rapid expansion and growth. Manufacturers of such panels, being under competitive pressure to look for ever greater production economies through mechanization, are increasingly using modern, highly efficient panel presses, so that it becomes necessary to also use more sophisticated panel layer assembly units and press pack feeding units, in order to fully utilize the capacity of a modern panel press of single-level or multi-level construction. At the same time, such an installation must be quickly adaptable to the production of a variety of layered pressed panels, including the application of outer layers of wood veneer, paper, and plastic to carrier panels, and the assembly of pressboard panels, soundproofing panels, plywood panels, and furniture panels, for example. The panel layer assembly device must be capable of collecting and assembling the individual layers into a press pack, and to feed a succession of accurately assembled press packs to the panel press.

Known devices for assembling large panel layers into press packs operate either semi-automatically or fully automatically, using a vertically movable suction bank, supported on a carriage, which is suspended from overhead rails. After the carriage is moved over a large stack, its suction bank picks up a panel layer and carries it to an assembly table, where it is deposited on top of other, previously collected panel layers. The assembled press pack is then transferred from the assembly table to a press pack feeding station where it is inserted into the panel press by means of a roller conveyor, or a belt conveyor, or with the aid of transfer panels of sheet metal.

A more advanced layer assembly device is suggested in U.S. Pat. No. 3,914,154. This patent discloses a collecting carriage which is suspended on overhead rails and which moves from layer stack to layer stack, along a row of stack tables. At the near edge of each stack table is arranged a stationary edge lifting device with a vertically movable suction bank, capable of raising the edge of the uppermost panel layer, while the collecting carriage advances over the layer stack, thereby sliding a collecting palette, which carries on it a partially assembled press pack, under the partially raised layer.

Great care must be taken to avoid damage to the thin panel layers during collection, the risk of damage being particularly high in connection with thin and very large panel layers. It has therefore become necessary to completely mechanize the layer collecting procedure. Nevertheless, the time required for assembling a complete press pack from a large number of layer stacks, and for transferring it to the panel press is oftentimes too long, in comparison to the duration of the pressing cycle of a modern panel press. The situation becomes quite unbalanced in the case of certain layered pressed panels which require panel packs composed of up to eight different panel layers, in order to obtain the desired surface pattern, coloring, and/or mechanical characteristics, or in the case of chipboard panels which have to be covered with up to three outer layers on each side. The discrepancy of output performance is particularly severe in the case of panel presses which are of the multi-level type, or in the case of so-called rapid cycling panel presses which are capable of pressing several successive press packs simultaneously.

A partial reason for the relative inefficiency of the known panel layer assembly devices lies in their inadequate acceleration characteristics, as well as in their inability of repeatedly stopping with great accuracy, for a precise positioning of the panel layers in the panel layer collecting station.

SUMMARY OF THE INVENTION

Underlying the present invention is the primary objective of avoiding the aforementioned shortcomings of the prior art press pack assembly devices by devising an improved panel layer collecting and press pack assembling device which is capable of operating at a higher speed and with more accuracy than was previously possible.

The present invention proposes to attain this objective by suggesting an improved press pack assembly device which features at least one, and preferably several panel layer collecting lines, each equipped with a collecting carriage which is suspended on overhead rails and which is moved back and forth by means of a crank drive. The precisely repeatable stroke of the crank drive corresponds to the distance over which a panel layer has to be moved from its layer stack to the collecting station which is located on top of a transversely oriented layer collecting conveyor. This conveyor is of the start-stop type, having on its upper belt run as many collecting stations, as there are layer collecting lines associated with it.

A maximum of output of such a press pack assembly device is achievable, if the installation has a separate layer collecting line for each layer stack and a corresponding collecting station for each collecting line on the press pack assembly conveyor. In such a system, the press pack assembly conveyor advances one step, i.e. from one collecting station to the next, after each layer transfer cycle of the collecting lines. The collecting lines operate in unison, so that a complete press pack is assembled during each operating cycle. However, in the case of press packs requiring a large number of panel layers, such an arrangement may present difficulties in connection with the required length of the collecting conveyor, or it may be too costly in terms of machinery and/or space requirements.

A preferred embodiment of the invention, therefore, suggests the arrangement of two layer stacks in each collecting line, the stacks being located on opposite sides of the transverse press pack assembly conveyor. This arrangement makes it possible for a single collecting carriage to alternatingly singulate panel layers from the two panel stacks in a crank-generated movement which has no empty return stroke or other dead motion. For this purpose, the collecting carriage is equipped with two suction banks, one for each layer stack, so that, as one suction bank releases a collected panel layer in the collecting station, the other suction bank is located above the edge of the opposite layer stack, where it singulates the uppermost panel layer by lifting its edge portion from the layer stack. The same half-stroke of the crank drive which transfers the singulated panel layer to the collecting station also returns the other suction bank to the edge of its layer stack, for a new singulation step. Each collecting line thus deposits during each full crank stroke two panel layers in the collecting station. The transverse press pack assembly conveyor is timed to advance one step after each complete crank rotation.

Instead of using two suction banks on the collecting carriage, it is also possible to use only a single suction bank, in which case it becomes necessary to provide a supplementary motion mechanism on the collecting carriage whose stroke equals the distance between the release position in the collecting station and the singulating position on the edge of the other layer stack. In the case of dual suction banks, it may be necessary to provide a vertical displacement capability or pivotability on the suction banks themselves, in order to accommodate possible differences in the pickup level on the two layer stacks. It may also be advantageous to use a crank drive for the vertical movements of the suction bank, or banks.

The present invention further suggests an effective solution to the problem of accurately positioning the layer stacks in relation to the layer collecting lines and press pack assembly line. The suggested approach includes the arrangement of vertical light beams in the four corners of each layer stack, serving as positioning markers. For purposes of adjustment, each layer stack is supported by a movable stack palette, whose stationary base supports a horizontally displaceable base frame. The adjustment settings are preferably obtained by means of three horizontally oriented hydraulic cylinders which connect the base frame to the stationary base. Suitable hydraulic control valves can be operated manually, as the operator visually verifies the stack position in relation to the light beam markers on the stack corners.

The collecting carriage of each layer collecting line is preferably suspended on two parallel overhead rails, the rails being part of an overhead frame structure which extends above and parallel to the press pack assembly conveyor. While the crank drive for the collecting carriage has a precisely predetermined stroke, the latter can nevertheless be adjusted in length by increasing or decreasing the crank radius, i.e. by changing the position of the crank pin which connects the connecting rod to the crank, or by otherwise changing the crank length.

BRIEF DESCRIPTION OF THE DRAWINGS

Further special features and advantages of the invention will become apparent from the description following below, when taken together with the accompanying drawings which illustrate, by way of example, several embodiments of the present invention, represented in the various figures as follows.

DESCRIPTION OF THE PREFERRED EMBODIMENTS

Figures 1, 2, 3:
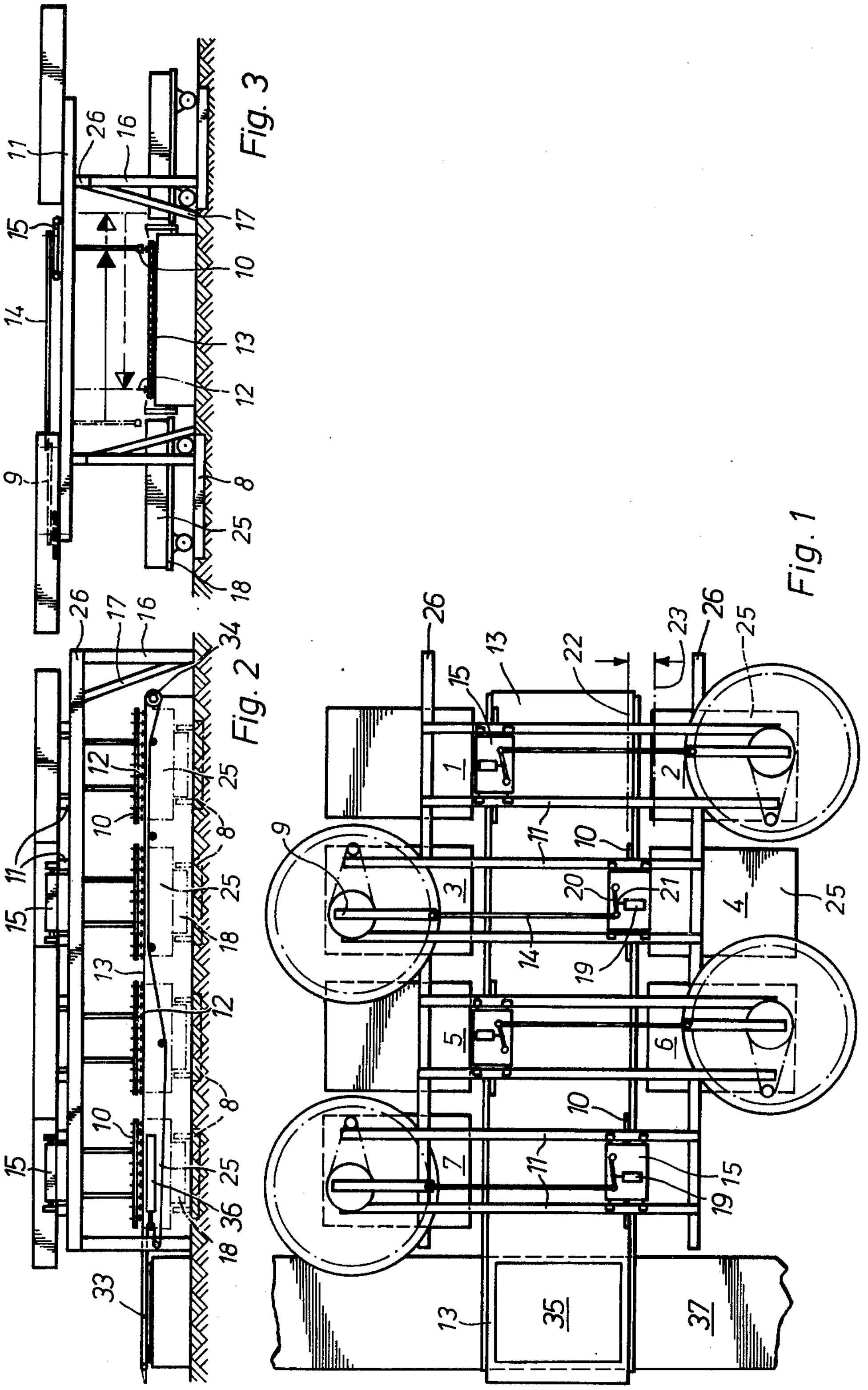
FIG. 1 shows, in a somewhat schematic plan view, a device for assembling a number of large panel layers into a press pack, in accordance with the present invention.
FIG. 2 shows the device of FIG. 1 in an elevational view.
FIG. 3 shows the device of FIG. 1 in an end view.

In the drawings is illustrated schematically a device which is designed for collecting a plurality of large panel layers from separate layer stacks and for assembling the layers into press packs on a press pack assembly conveyor. The resulting succession of press packs is then fed to a panel press in which the adhesive between the panel layers is cured, under the application of heat and pressure.

As is shown in FIGS. 1, 2 and 3, a preferred embodiment of the invention consists essentially of a number of separate layer collecting lines, each being equipped with a collecting carriage 15 and a crank drive 9, 14. The layer collecting lines are arranged side-by-side and in parallel alignment with each other, so that each collecting line bridges a transversely extending press pack assembly conveyor 13.

The press pack assembly conveyor 13 is a start-stop conveyor with a flat endless conveyor belt. Facing the forward extremity of the conveyor 13 is a press pack feed conveyor 37 which runs parallel to the layer collecting lines. On the forward portion of the press pack assembly conveyor 13 is arranged a horizontally extendable transfer frame carrying an S-shaped conveyor belt portion 33 which is extendable over the feed conveyor 37, for the transfer of an assembled press pack 35 onto the conveyor 37. A cylinder 36 extends and retracts the transfer frame with the extendable belt portion 33.

As can best be seen in FIG. 1, a regular layer collecting line reaches over two layer stacks 25 which are arranged adjacent to and on opposite sides of the press pack assembly conveyor 13. The latter thus defines on its upper belt run a series of layer collecting stations, located half-way between each pair of layer stacks 25.

The collecting carriage 15 of each collecting line is suspended on a pair of overhead guide rails 11. On one extremity of the rails 11 is arranged a rotating crank 9 which is connected to the collecting carriage 15 by means of a connecting rod 14, thereby driving the carriage 15 in a reciprocating motion between the near edge of the layer stack 25 and the collecting station on the press pack assembly conveyor 13 (see FIG. 3).

Each collecting carriage 15 is equipped with a vertically movable suction bank 10 whose length is equal to the width of a panel layer. Oriented downwardly from the suction bank 10 is a series of suction heads 12 which, after engaging the edge portion of a panel layer on a layer stack 25, make it possible for the collecting carriage 15 to singulate the panel layer from the stack and to pull it sideways onto the press pack assembly conveyor 13. The panel layer is released again, when its position coincides precisely with the area of the collecting station on the conveyor 13.

The movement of the collecting carriage 15 and of its suction bank 10 is indicated by horizontal arrows in FIG. 3. There, it can be seen that the suction bank 10, after depositing a panel layer which it had collected from one side of the conveyor 13, is positioned only a short distance away from the near edge of the panel layer on the opposite side of the assembly conveyor 13.

While the crank drive 9, 14 is ideally suited for the generation of a reliably accurate reciprocating motion for the collection of panel layers from one side of the press pack assembly conveyor 13, it is normally unsuitable for the generation of a reciprocating motion with an intermediate stop, as is required for the movement of the suction bank 10 which is indicated by the arrows in FIG. 3. The present invention, therefore, suggests an additional mechanism which creates the required short supplemental stroke from the point of deposit of a collected panel layer to the point of singulation of a panel layer from the opposite layer stack.

Figure 4:
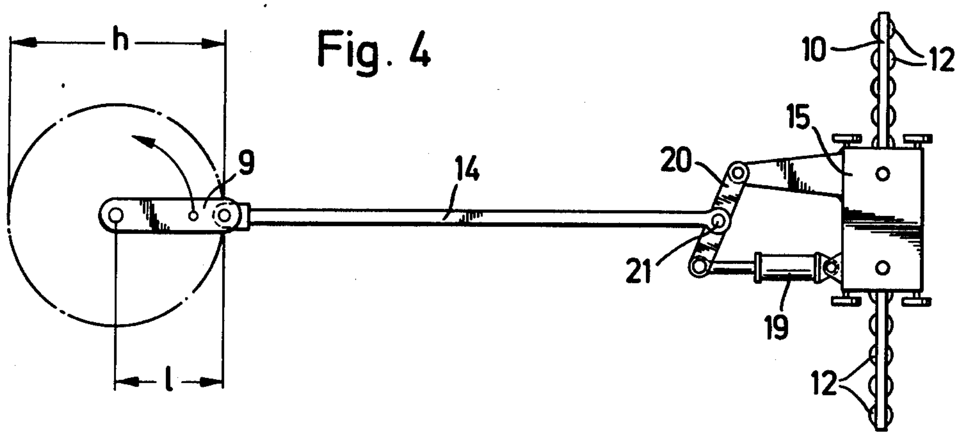
FIG. 4 shows, in an enlarged schematic representation, a first version of a crank drive for a layer collecting line of the embodiment of FIGS. 1–3.

A preferred supplemental stroke mechanism is shown in FIG. 4. It consists of a transversely extending pivot link 20 whose swinging end is connected to the piston rod 21 of a double-acting cylinder 19, while the connecting rod 14 is pivotably connected to the midportion of the pivot link 20. The cylinder 19, executes a reciprocating stroke of twice the distance required for the supplemental stroke of the collecting carriage 15. It moves from the retracted position to the extended position, when the carriage is to pick up a panel layer from the panel stack 25 on the far side of the assembly conveyor 13, and it remains locked in that position during the next semi-cycle of the crank 9, during which the panel layer is transferred to the collecting station. As soon as this panel layer has been released, the cylinder 19 retracts its piston rod 21, thereby executing another supplemental stroke to bring the suction head 10 to the pickup edge of the near layer stack 25.

Using a crank drive to execute the carriage movement which transfers the panel layers from the layer stacks 25 to the collecting stations has not only the advantage of a much greater positioning accuracy than would be obtainable with limit switches controlling a motor-driven carriage, it also has the advantage of providing a very smooth acceleration and deceleration of the panel layers during transfer. The cylinder controlled supplemental stroke, on the other hand, need not have the same smoothness of acceleration and deceleration, since this stroke is executed with an empty suction head 10. Yet, the cylinder 19 assures reliably accurate end positions through abutment of its piston rod 21 in its retracted and extended positions.

Figure 5:
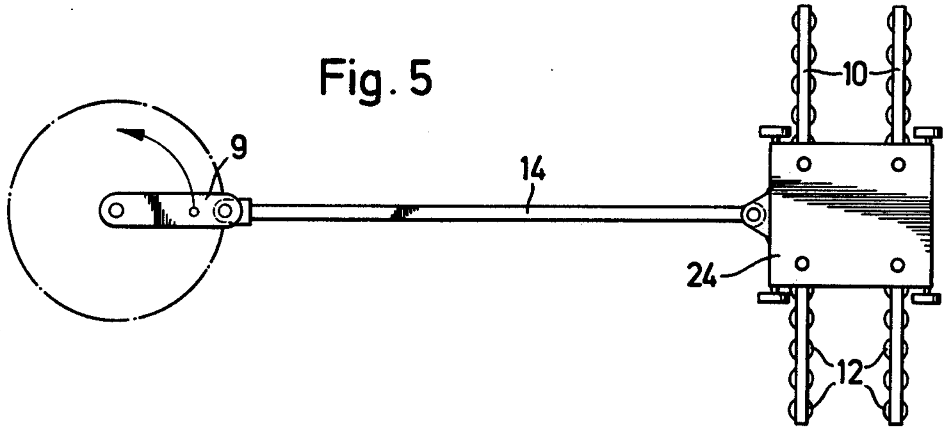
FIG. 5 shows a second version of a crank drive, similar to that of FIG. 4.
Figure 6:
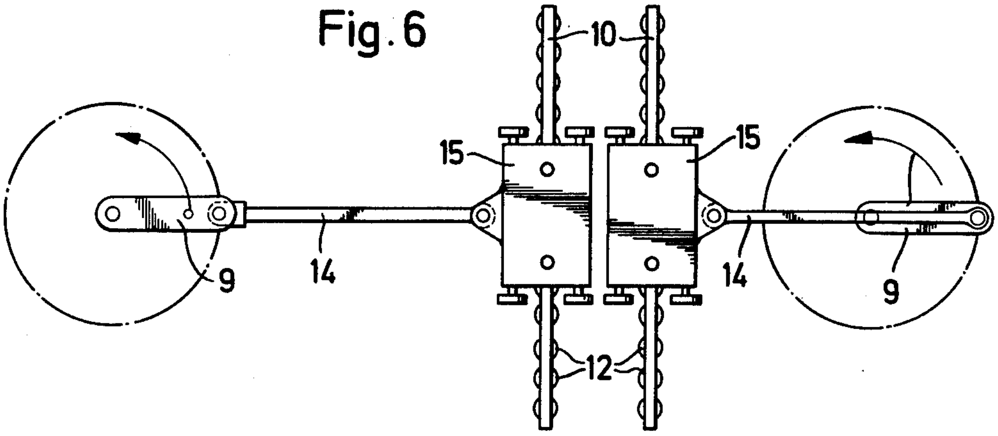
FIG. 6 shows a third version of a crank drive.

In FIGS. 5 and 6 are shown two alternative embodiments of the collecting carriage and crank drive, where the problem of the supplemental stroke is resolved in a different manner. In FIG. 5, the collecting carriage 24 carries two suction heads 10, at a horizontal distance which is equal to the required supplemental stroke. In this case, the near suction bank 10 serves to pick up panel layers from the near panel stack, while the distal suction bank 10 serves to pick up panel layers from the opposite layer stack. This embodiment requires independent control mechanisms for the suction banks 10.

The embodiment of FIG. 6 has two separate collecting carriages 15 each having a suction bank 10 and being driven by its own crank drive 9, 14. This embodiment has the advantage, that one half of the collecting line can readily be shut down, if panel layers from only one side of the assembly conveyor are to be collected. Generally, the arrangement of dual collecting carriages, or of dual suction banks 10, on a single collecting carriage 24 has the advantage that the release of a collected panel layer and the pickup of another panel layer can take place simultaneously, thereby further shortening the time required for the layer collecting operation.

Referring again to FIG. 1, it will now be evident that, as each crank drive executes a full rotation, it collects and assembles two panel layers from opposite layer stacks 25 on the press pack assembly conveyor 13. The four layer collecting lines of FIG. 1 operate in unison, simultaneously depositing alternatingly three and four layers on the four collecting stations on the upper belt run of the assembly conveyor 13.

At the end of each cycle, i.e. after each full rotation of the crank drives, the press pack assembly conveyor 13 is advanced one step towards the press pack feed conveyor 37. This means that the panel layers 1 and 2 which have been assembled on the collecting station of the first collecting line are shifted to the collecting station of the second collecting line, where, in the course of the next operating cycle, panel layers 3 and 4 are placed on top of layers 1 and 2. Simultaneously, the partially assembled press pack, which already contains panel layers 1 through 4, is being shifted to the third collecting station, where the layers 5 and 6 are added. A seventh panel layer 7 is added to the press pack in the last layer collecting line. The fact that this line collects panel layers from only one layer stack exemplifies the adaptability of the device to different press pack requirements.

The press pack assembly conveyor 13 thus delivers a complete press pack 35 at the end of each operating cycle, depositing it on the feed conveyor 37. The extendable conveyor mechanism which serves to automatically transfer the press packs 35 from the assembly conveyor 13 to the feed conveyor 37 is described in more detail in our co-filed application, Ser. No. 767,319.

It should be understood that the press pack assembly conveyor 13 could also be arranged to transfer the assembled press packs 35 directly to a panel press, or onto a suitable storage rack, for temporary storage.

The longitudinal overhead guide rails 11 which carry the collecting carriages 15 or 24, are supported on transversely extending overhead frame members 26 which, in turn, rest on columns 16 and braces 17, as shown in FIG. 3.

Figure 7:
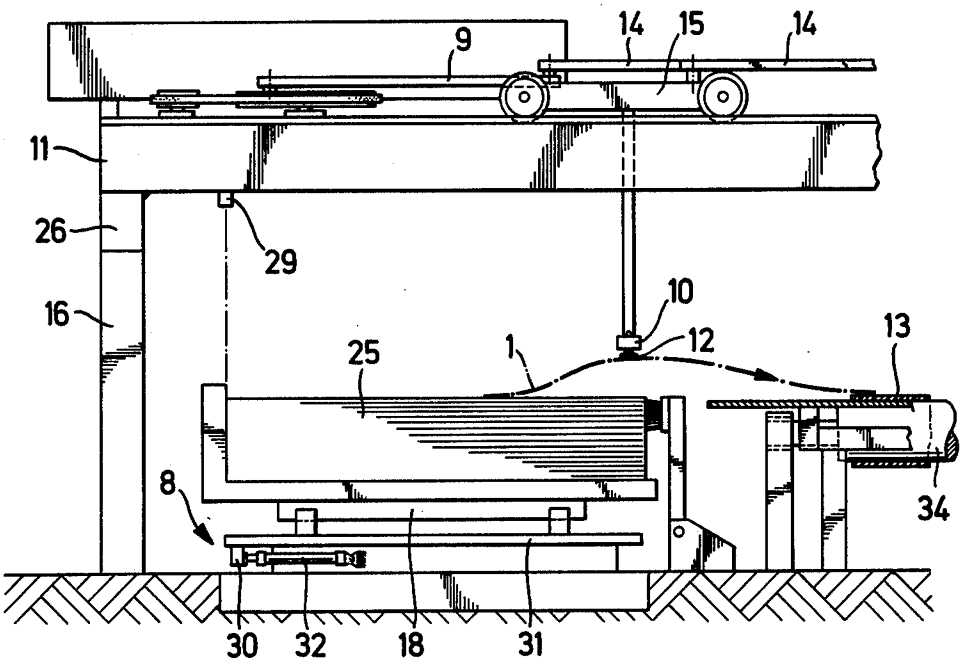
FIG. 7 shows a portion of FIG. 3 at an enlarged scale, illustrating certain details of the invention.

FIG. 7 also shows a preferred solution to the problem of accurately locating the layer stacks in reference to the stationary structure of the layer collecting line, in order to assure the precise assembly of each press pack on the press pack assembly conveyor 13. For this purpose, the invention suggests the arrangement of fixed light sources on the overhead structure, preferably on the rails 11, which produce marker beams 29 indicating the four corners of the layer stack 25. The latter, in order to be repositionable horizontally to the exact location of the corner marker beams, is supported on a positioning table 8, consisting of a stationary base 30 and a movable base frame 31. Three hydraulic cylinders 32 position the base frame 31 in relation to the stationary base 30. The layer stack 35 can thus remain on its stack palette 18, having been placed there by a fork lift truck, for example.

Figure 8:
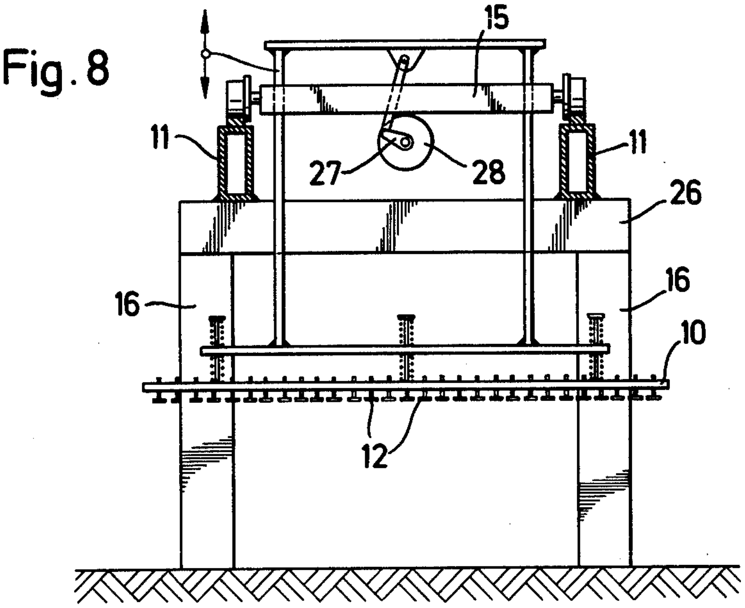
FIG. 8 shows a portion of FIG. 2 at an enlarged scale.

The vertical movement of each suction bank 10, in relation to its collecting carriage 15, is preferably likewise generated by means of a crank drive 27, 28, shown in FIG. 8. As in the case of the horizontal crank drive which controls the layer transfer from a layer stack 25 to a collecting station, the vertical crank drive assures a smooth acceleration and deceleration of the suction heads, for a rapid and reliable pickup action of the suction banks 10.

It should be understood, of course, that the foregoing disclosure describes only preferred embodiments of the invention and that it is intended to cover all changes and modifications of these examples of the invention which fall within the scope of the appended claims.

We claim the following:

1. A device for collecting large flexible panel layers, including very thin panel layers, from separate layer stacks and for assembling them into press packs, ready for transfer to a panel press, for the production of layered press panels, for example, the device comprising in combination:

a plurality of parallel layer collecting lines arranged side-by-side and uniformly spaced from one another; each layer collecting line having at least one layer stack associated therewith;

a press pack assembly conveyor having an endless conveyor belt running transversely to the layer collecting lines and past all layer stacks at a short distance therefrom; and means for driving the press pack assembly conveyor in a stepping motion, the distance of each step being equal to the spacing between the layer collecting lines; and wherein the press pack assembly conveyor defines a press pack collecting station for each layer collecting line;

each layer collecting line includes: a collecting carriage; means for guiding the collecting carriage for shuttle movements between its layer stack and its collecting station on the press pack assembly conveyor; a suction bank on the collecting carriage capable of singulating a panel layer from the layer stack and of transferring it, under the movement of the collecting carriage, to the collecting station; and a horizontal crank drive connected to the collecting carriage for the creation of said shuttle movements;

the crank drives of all layer collecting lines operate in unison;

the suction bank of each carriage is guided for vertical movements in relation to the carriage and each carriage includes means for moving the suction bank vertically;

at least one of the collecting lines has two layer stacks arranged on opposite sides of the press pack assembly conveyor, in alignment with and identically spaced from the collecting station on said conveyor;

the collecting carriage of said line executes shuttle movements for the alternating pickup and collection of panel layers from both of said layer stacks;

the collecting carriage guide means of said line includes overhead guide rails extending across said conveyor;

the crank drive for the collecting carriage of said line has a crank radius for a carriage stroke which is equal to the distance to be travelled by a panel layer between its stack and the collecting station;

said crank drive further includes a mechanism for creating a supplemental stroke of the collecting carriage which is equal to the distance between the point of release of one panel layer on the collecting station and the point of pickup of the next panel layer on the opposite layer stack, said supplemental stroke mechanism being so related to the crank drive that its effect on the movement of the suction bank on the collecting carriage is to longitudinally shift its crank-generated stroke by the supplemental stroke; and the suction banks on the collecting carriages are arranged to engage the panel layers in the area of the edges which are located nearest to the press pack assembly conveyor, lifting only an edge portion of each panel, as the suction banks move vertically, and transferring each panel from its stack to a collecting station on the press pack assembly conveyor by pulling the panel sideways from its stack, as the collecting carriage executes its shuttle movement.

2. A press stack assembling device as defined in claim 1, wherein the stroke length of the crank drives for the collecting carriage shuttle movements is adjustable through adjustment of the effective crank radius.

3. A press pack assembling device as defined in claim 1, wherein each carriage includes a vertical crank drive serving as said means for moving the suction bank vertically.

4. A press pack assembling device as defined in claim 1, wherein the number of layer collecting lines is equal to the number of panel layers in a press pack, so that the collecting carriages simultaneously transfer to the press pack assembly conveyor one each of said panel layers; and the press pack assembly conveyor drive means is synchronized with the horizontal crank drives of the collecting carriages, so as to execute a conveyor stepping motion while the collecting carriages move from their collecting stations to their layer stacks.

5. A press pack assembling device as defined in claim 1, wherein the crank drive includes a crank and a connecting rod attached to the collecting carriage;

the supplemental stroke mechanism includes means for shifting the point of connection between the connecting rod and the collecting carriage.

6. A press pack assembling device as defined in claim 5, wherein said shifting means of the supplemental stroke mechanism includes a transversely extending pivot link, having a fixed pivot point at the collecting carriage and being connected to one end of the connecting rod and to a cylinder-type actuator whose stroke swings the pivot link towards and away from the collecting carriage.

7. A press pack assembling device as defined in claim 1, further comprising:

means for repositioning the layer stacks in relation to each other and in relation to the press pack assembly conveyor, through displacements in a horizontal plane, in at least two non-coinciding directions the suction banks on the collecting carriages are arranged to engage the panel layers in the area of the edges which are located nearest to the press pack assembly conveyor, lifting only an edge portion of each panel, as the suction banks move vertically, and transferring each panel from its stack to a collecting station on the press pack assembly conveyor by pulling the panel sideways from its stack, as the collecting carriage executes its shuttle movement.

8. A press pack assembling device as defined in claim 7, wherein the layer stack repositioning means includes, under each layer stack a stationary stack base carrying thereon a displaceable base frame which, in turn, carries the layer stack, and it further includes positioning drive means for moving the base frame in relation to the stack base in said two non-coinciding directions.

9. A press pack assembling device as defined in claim 8, wherein the positioning drive means includes a plurality of differently oriented cylinder-type actuators whose extremities are connected to the stack base and to the base frame, respectively.

10. A press pack assembling device as defined in claim 8, wherein the layer stack repositioning means further includes stationary position markers which indicate the nominal position of each layer stack in said horizontal plane.

11. A press pack assembling device as defined in claim 10, wherein said position markers are vertically downwardly aimed narrow light beams, indicating the nominal positions of the corners of the layer stacks.

12. A press pack assembling device as defined in claim 11, wherein the layer collecting lines further include a common overhead structure, supporting thereon a pair of longitudinal guide rails for each layer collecting line and light sources for said light beam position markers.

* * * * *